(12) United States Patent
Tsai et al.

(10) Patent No.: US 9,229,677 B2
(45) Date of Patent: Jan. 5, 2016

(54) CONTROL SYSTEM WITH SERIAL INTERFACE

(75) Inventors: Tsung-Hsien Tsai, Taichung (TW); Wei-Chih Wang, Hsinchu (TW); Yien-Lin Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 203 days.

(21) Appl. No.: 13/429,443

(22) Filed: Mar. 26, 2012

(65) Prior Publication Data

US 2013/0002617 A1  Jan. 3, 2013

(30) Foreign Application Priority Data

Jun. 28, 2011 (TW) .............................. 100122640 A

(51) Int. Cl.
*G09G 3/36* (2006.01)
*G06F 3/14* (2006.01)

(52) U.S. Cl.
CPC ........ *G06F 3/1431* (2013.01); *G09G 2370/045* (2013.01)

(58) Field of Classification Search
CPC . G09G 3/3648; G09G 3/3614; G09G 3/3688; G09G 3/3611; G09G 3/3655
USPC ........ 345/204, 87, 175, 88; 340/82, 825, 800, 340/801; 348/14, 16, 340, 552, 14.01; 341/22, 67
See application file for complete search history.

(56) References Cited

U.S. PATENT DOCUMENTS

| 5,021,775 | A  | * | 6/1991 | Babin ........................... 345/213 |
| 7,675,512 | B2 | * | 3/2010 | Koyama et al. ............... 345/205 |
| 2003/0001810 | A1 | * | 1/2003 | Yamaguchi et al. ............ 345/87 |
| 2007/0281741 | A1 | * | 12/2007 | Lu et al. ........................ 455/557 |
| 2008/0024398 | A1 | * | 1/2008 | Hwang .......................... 345/60 |
| 2009/0019248 | A1 | * | 1/2009 | Jeong et al. ................... 711/163 |

FOREIGN PATENT DOCUMENTS

| CN | 101004897 | 7/2007 |
| CN | 101145324 | 3/2008 |
| TW | 201019216 | 5/2010 |

OTHER PUBLICATIONS

"Office Action of Taiwan Counterpart Application", issued on Jan. 22, 2014, p. 1-p. 9.
"Office Action of China Counterpart Application", issued on Feb. 27, 2014, p. 1-p. 9.

* cited by examiner

*Primary Examiner* — Shaheda Abdin
(74) *Attorney, Agent, or Firm* — Jianq Chyun IP Office

(57) ABSTRACT

A control system with a serial interface is provided. The control system includes a programmable database, a first driver, at least one second driver, and a controller. A data is written into the programmable database through a programming method. The first driver is coupled to the programmable database via the serial interface. The at least one second driver is coupled with the first driver. The controller is coupled with the serial interface and accordingly coupled to the programmable database and the first driver via the serial interface. The controller captures the data from the programmable database through the serial interface and adjusts parameters of the first driver and the at least one second driver according to the data.

9 Claims, 3 Drawing Sheets

CONTROL SYSTEM WITH SERIAL INTERFACE

CROSS-REFERENCE TO RELATED APPLICATION

This application claims the priority benefit of Taiwan application serial no. 100122640, filed on Jun. 28, 2011. The entirety of the above-mentioned patent application is hereby incorporated by reference herein and made a part of this specification.

BACKGROUND OF THE INVENTION

1. Field of the Invention

The invention generally relates to a control system, and more particularly, to a control system with a serial interface.

2. Description of Related Art

Along with the development of technologies, imaging devices have become one of the most common products in our daily life. Particularly, displays are one of the most indispensable components in these imaging devices. A user reads messages or even indirectly controls the operation of an imaging device through a display. Additionally, the rapid advancement of semiconductor technology makes it possible to gradually replace the conventional cathode ray tube (CRT) displays with flat panel displays (FPD). Among different types of FPDs, liquid crystal display (LCD) has become the mainstream product thanks to its many advantages, such as low operating voltage, no radiation, light weight, and small volume.

A LCD usually includes a timing controller and a LCD driver. Many signal lines are usually disposed between the timing controller and the LCD driver for transmitting different control signals and data. However, a conventional timing controller cannot directly adjust the internal function of a LCD driver, and the adjustment of internal function of a LCD driver can only be carried out through pins of the LCD driver. Thus, the internal function of a LCD driver cannot be changed once the hardware design is completed, which may affect the data transmission rate and the display quality of the LCD or may even result in unnecessary power consumption.

SUMMARY OF THE INVENTION

Accordingly, the invention is directed to a control system with a serial interface, and internal function of the control system can be adjusted without changing the hardware design thereof.

The invention provides a control system with a serial interface. The control system includes a programmable database, a first driver, at least one second driver, and a controller. Data is written into the programmable database through a programming method. The first driver is coupled to the programmable database via the serial interface. The at least one second driver is coupled with the first driver. The controller is coupled with the serial interface and accordingly is respectively coupled to the programmable database and the first driver via the serial interface. The controller captures the data from the programmable database through the serial interface and adjusts parameters of the first driver and the at least one second driver according to the data.

According to an embodiment of the invention, the programmable database has a first pin and a second pin, and the first driver has a third pin and a fourth pin. The first pin is coupled with the third pin via the serial interface, and the second pin is coupled with the fourth pin via the serial interface.

According to an embodiment of the invention, the at least one second driver has a fifth pin and a sixth pin. The fifth pin is coupled with the first pin of the programmable database via the serial interface, and the sixth pin is coupled with the second pin of the programmable database via the serial interface, where the controller controls the at least one second driver through the serial interface.

According to an embodiment of the invention, the controller is coupled with the first pin of the programmable database via the serial interface and coupled with the second pin of the programmable database via the serial interface, and the controller controls the at least one second driver through the first driver.

According to an embodiment of the invention, the parameters determine the driving capabilities of the first driver and the at least one second driver.

According to an embodiment of the invention, the parameters determine signal reception times of the first driver and the at least one second driver.

According to an embodiment of the invention, the first driver and the at least one second driver further respectively include an input stage, and the controller adjusts signal reception rates of the input stages by adjusting the parameters.

According to an embodiment of the invention, when the controller adjusts the parameters of one of the first driver and the at least one second driver according to the data, the one of the first driver and the at least one second driver sends an acknowledge signal back to the controller.

According to an embodiment of the invention, the first driver and the at least one second driver are liquid crystal display (LCD) drivers.

According to an embodiment of the invention, the serial interface is a serial peripheral interface (SPI) or an inter-integrated circuit bus ($I^2C$ bus).

According to an embodiment of the invention, the programmable database is an electrically erasable programmable read-only memory (EEPROM).

As described above, in an embodiment of the invention, after capturing the data from the programmable database through the serial interface, the controller can further adjust the parameters of the first driver and the at least one second driver through the serial interface according to the captured data. Thus, the internal functions of the first driver and the at least one second driver can be adjusted without changing the hardware structures thereof. Thereby, the control system provided of the present embodiment can be made very flexible in its application and can be easily integrated with other hardware.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
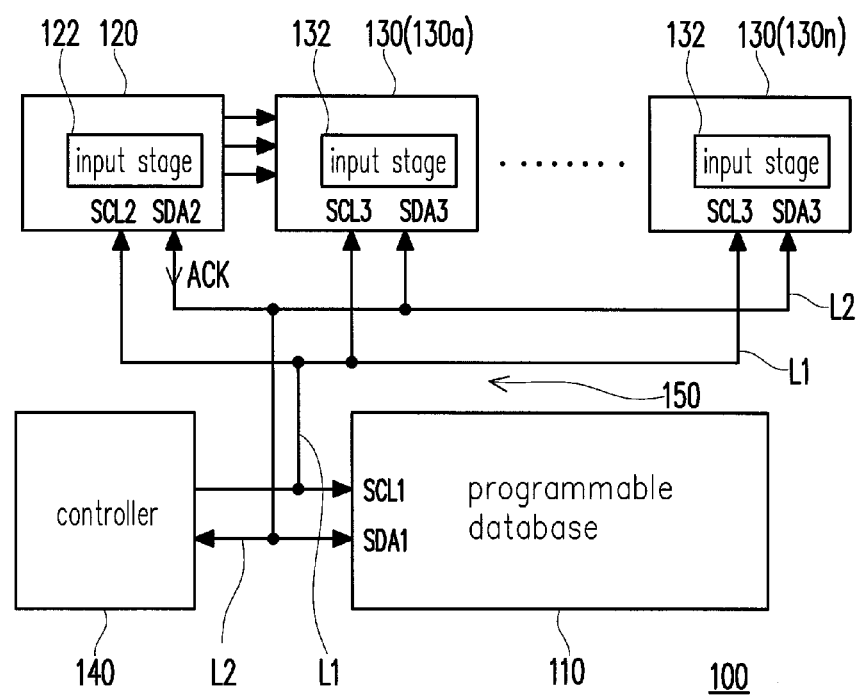
FIG. 1 is a diagram of a control system with a serial interface according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In following embodiments, the serial interface is assumed to be an inter-integrated circuit bus ($I^2C$ bus), and the programmable database is assumed to be an electrically erasable programmable read-only memory (EEPROM). However, it should be understood by those having ordinary knowledge in the art that the $I^2C$ bus and the EEPROM are not intended to limit the scope of the invention.

First Embodiment

FIG. 1 is a diagram of a control system with a serial interface according to the first embodiment of the invention. Referring to FIG. 1, the control system 100 includes a programmable database 110, a driver 120, at least one driver 130, and a controller 140. In the present embodiment, data is written into the programmable database 110 through a programming method. Herein the data may be a program code used by the controller 140 for controlling the drivers 120 and 130, and the program code is related to internal parameters of the drivers 120 and 130.

As shown in FIG. 1, the driver 120 is coupled to the programmable database 110 via a serial interface 150. The serial interface 150 may be an SPI or an $I^2C$ bus, and the programmable database 110 may be an EEPROM. The driver 120 is coupled with the driver 130. The driver 120 and the driver 130 may be liquid crystal display (LCD) drivers and may be source drivers.

The controller 140 is coupled with the serial interface 150 and accordingly is respectively coupled to the programmable database 110 and the driver 120 via the serial interface 150. The controller 140 captures the data from the programmable database 110 through the serial interface 150 and adjusts the parameters of the driver 120 and the driver 130 according to the captured data. In the present embodiment, the controller 140 is a timing controller.

As shown in FIG. 1, the programmable database 110 has a pin SCL1 and a pin SDA1, and the driver 120 has a pin SCL2 and a pin SDA2, wherein the pin SCL1 is coupled with the pin SCL2 via the serial interface 150, and the pin SDA1 is coupled with the pin SDA2 via the serial interface 150. The pin SCL2 receives a serial clock of the controller 140 through a transmission line L1, and the pin SDA1 and the pin SDA2 transmit serial data through a transmission line L2.

On the other hand, the driver 130 has a pin SCL3 and a pin SDA3. The pin SCL3 is coupled with the pin SCL1 of the programmable database 110 via the serial interface 150, and the pin SDA3 is coupled with the pin SDA1 of the programmable database 110 via the serial interface 150. The controller 140 controls the driver 130 through the serial interface 150. Similarly, the pin SCL3 receives the serial clock of the controller 140 through the transmission line L1, and the pin SDA1 and the pin SDA3 transmit serial data through the transmission line L2.

As described above, in the present embodiment, because the drivers 120 and 130 are both coupled to the controller 140 and the programmable database 110 via the serial interface 150, the controller 140 can read data (for example, a program code) from the programmable database 110 and directly adjust the parameters of the drivers 120 and 130 through the serial interface 150 according to the data. Aforementioned parameters determine the driving capabilities of the driver 120 and the driver 130. To be specific, when the loading of a display panel increases, the controller 140 obtains a present driving current according to the data and adjusts related parameters of the driver 120 and the driver 130 according to the data to enhance the driving capabilities of the driver 120 and the driver 130, so as to allow an image to be properly displayed. On the other hand, when the loading of the display panel decreases, the controller 140 also adjusts the related parameters of the driver 120 and the driver 130 according to the data to lower the driving capabilities of the driver 120 and the driver 130, so as to reduce the power consumption. In other words, the controller 140 can adjust the internal functions of the drivers 120 and 130 through the serial interface 150 without changing any hardware structure. Thus, the control system 100 in the present embodiment is very flexible in its application.

Additionally, when the controller 140 adjusts the parameters of one of the driver 120 and the driver 130 according to the data, the driver 120 and the driver 130 send an acknowledge signal ACK back to the controller 140 such that the controller 140 can determine whether the driver to be adjusted is correct or whether a data to be written is correctly written. Namely, in the present embodiment, the control system 100 offers a driver identification function.

Moreover, in the present embodiment, the parameters adjusted by the controller 140 further determine the signal reception times of the driver 120 and the driver 130. To be specific, as shown in FIG. 1, the signals received by the driver 120 and the drivers 130a-130n may be asynchronous due to the different distances between these drivers and the controller 140. Thus, in order to allow the driver 120 and the drivers 130a-130n to receive complete signals, the controller 140 adjusts the parameters of the driver 120 and the drivers 130a-130n through the serial interface 150 to respectively determine the signal reception times of the driver 120 and the drivers 130a-130n.

Furthermore, as shown in FIG. 1, in the present embodiment, the driver 120 and the driver 130 further respectively include an input stage 122 and an input stage 132, and the controller 140 can adjust the signal reception rates of the input stages 122 and 132 by adjusting the parameters of the drivers 120 and 130. For example, in some cases, the controller 140 increases the values of parameters of the drivers 120 and 130 through the serial interface 150 to increase the signal reception rate of the receiver circuit (i.e., the input stages 122 and 132), so as to display an image properly. On the other hand, if a low reception frequency is desired, the controller 140 may also decrease the values of foregoing parameters to reduce electromagnetic interference (EMI) and power consumption.

Figure 2:
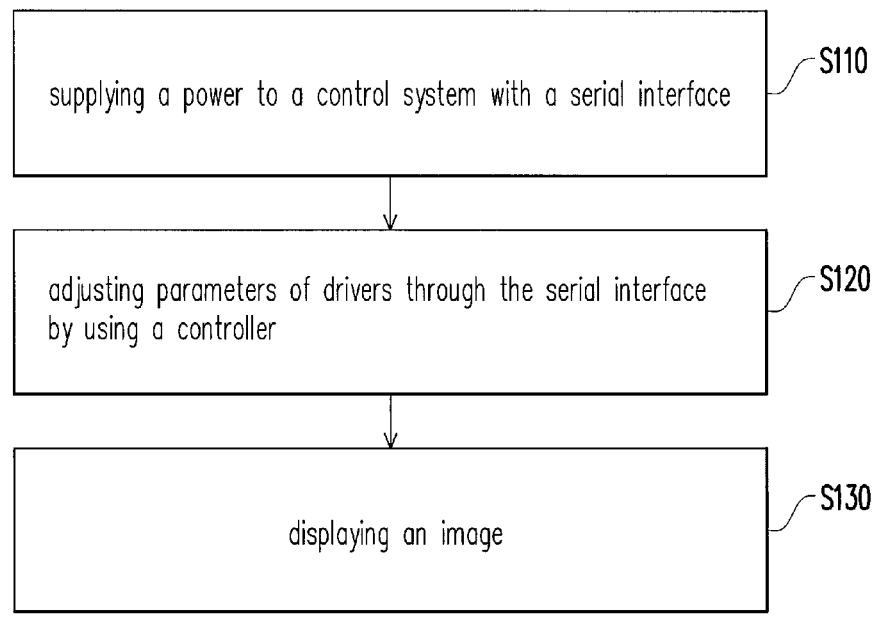
FIG. 2 is an operation flowchart of the control system in FIG. 1.

FIG. 2 is an operation flowchart of the control system in FIG. 1. Referring to FIG. 2, first, a power is supplied to the control system 100 (step S110). After the voltage stabilizes, the controller 140 adjusts parameters of the driver 120 and the driver 130 through the serial interface 150 (step S120). Next, an image is displayed properly (step S130).

It should be noted that in the present embodiment, the controller 140 always adjusts the parameters of the drivers 120 and 130 through the serial interface 150, so as to adjust the driving capabilities, signal reception times, signal reception rates, or other functions thereof. Thus, the controller 140 can adjust the internal functions of the drivers 120 and 130 without changing any hardware structure. Accordingly, the control system 100 can be made very flexible in its application and can be easily integrated with other hardware.

Second Embodiment

Figure 3:
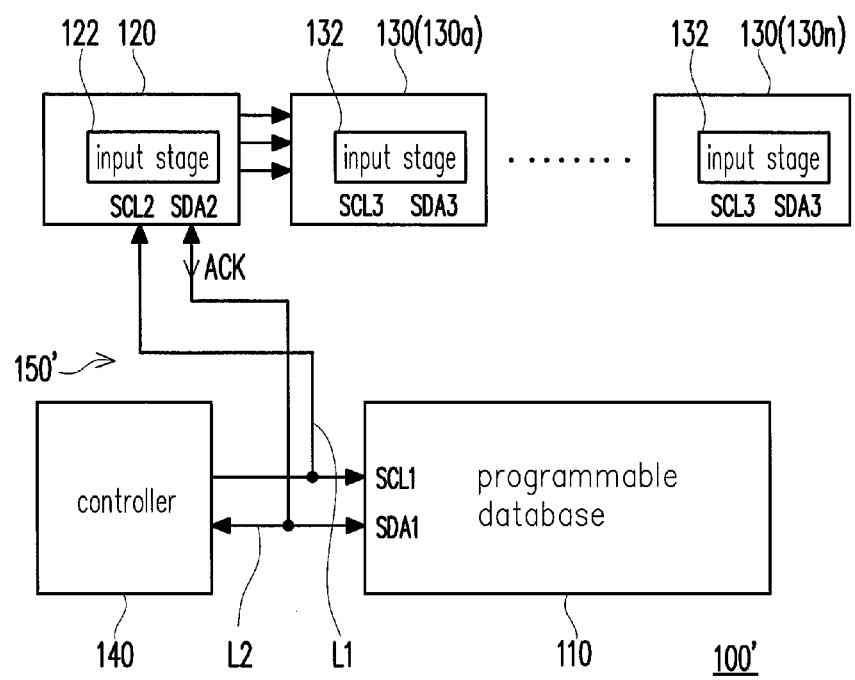
FIG. 3 is a diagram of a control system with a serial interface according to a second embodiment of the invention.

FIG. 3 is a diagram of a control system with a serial interface according to the second embodiment of the invention. The control system 100' in FIG. 3 is similar to the control system 100 in FIG. 1, and the main difference between the two control systems is that the driver 130 in FIG. 3 is not directly coupled with the serial interface 150'. Instead, it is indirectly coupled with the serial interface 150' via the driver 120.

To be specific, in the present embodiment, the controller 140 is coupled with the pin SCL1 of the programmable database 110 via the serial interface 150' and coupled with the pin SDA1 of the programmable database 110 via the serial interface 150'. Herein the pins SCL1 and SCL2 receive a serial clock of the controller 140 through a transmission line L1, and the pin SDA1 and the pin SDA2 transmit serial data through a transmission line L2. However, because none of the drivers 130a-130n is coupled with the serial interface 150', the controller 140 cannot directly control the drivers 130a-130n through the serial interface 150'. Instead, the controller 140 has to control the drivers 130a-130n through the driver 120.

Compared with the conventional technique, since fewer transmission lines L1 and L2 are used (i.e., the total length of the transmission lines is shorter) in the present embodiment, both EMI and hardware cost can be reduced. The operation details of the control system 100' in the present embodiment can be referred to descriptions of the first embodiment therefore will not be described herein.

As described above, in an embodiment of the invention, after capturing data from a programmable database through a serial interface, a controller can further adjust parameters of the drivers through the serial interface according to the captured data. Thus, the internal functions of the drivers can be adjusted without changing any hardware structure. Thereby, the control system provided in the present embodiment can be made very flexible in its application and can be easily integrated with other hardware.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A control system with a serial interface, comprising:
a non-transitory programmable database, wherein a data is written into the non-transitory programmable database through a programming method;
a first driver, directly coupled to the non-transitory programmable database via the serial interface;
at least one second driver, coupled with the first driver; wherein the first driver and the second driver are LCD drivers; and
a controller, directly coupled with the non-transitory programmable database and the first driver via the serial interface, wherein the controller captures the data from the non-transitory programmable database through the serial interface and adjusts parameters of the first driver and the at least one second driver according to the data, wherein the non-transitory programmable database has a first pin and a second pin, and the first driver has a third pin and a fourth pin, wherein the first pin is coupled with the third pin via the serial interface, and the second pin is coupled with the fourth pin via the serial interface, wherein the controller is coupled with the first pin of the non-transitory programmable database via the serial interface and coupled with the second pin of the non-transitory programmable database via the serial interface, and the controller controls the second driver through the first driver.

2. The control system according to claim 1, wherein the at least one second driver has a fifth pin and a sixth pin, wherein the fifth pin is coupled with the first pin of the non-transitory programmable database via the serial interface, the sixth pin is coupled with the second pin of the non-transitory programmable database via the serial interface, and the controller controls the second driver through the serial interface.

3. The control system according to claim 1, wherein the parameters determine driving capabilities of the first driver and the second driver.

4. The control system according to claim 1, wherein the parameters determine signal reception times of the first driver and the at least one second driver.

5. The control system according to claim 1, wherein the first driver and the at least one second driver further respectively comprise an input stage, and the controller adjusts signal reception rates of the input stages by adjusting the parameters.

6. The control system according to claim 1, wherein when the controller adjusts the parameters of one of the first driver and the at least one second driver according to the data, the one of the first driver and the at least one second driver sends an acknowledge signal back to the controller.

7. The control system according to claim 1, wherein the first driver and the at least one second driver are liquid crystal display drivers.

8. The control system according to claim 1, wherein the serial interface is a serial peripheral interface or an inter-integrated circuit bus.

9. The control system according to claim 1, wherein the non-transitory programmable database is an electrically erasable programmable read-only memory.

* * * * *